United States Patent [19]

D'Amato

[11] 4,409,513

[45] Oct. 11, 1983

[54] ELECTRODE FOR AN ELECTRON GUN

[75] Inventor: Ralph J. D'Amato, Lancaster, Pa.

[73] Assignee: RCA Corporation, New York, N.Y.

[21] Appl. No.: 308,841

[22] Filed: Oct. 5, 1981

Related U.S. Application Data

[63] Continuation-in-part of Ser. No. 145,237, Apr. 3, 1980, Pat. No. 4,318,026.

[51] Int. Cl.³ .................. H01J 1/46; H01J 17/04; H01J 19/38; H01J 19/40
[52] U.S. Cl. .................... 313/348; 313/449; 313/444; 313/447; 313/349; 313/452
[58] Field of Search ............ 313/348, 349, 444, 447, 313/448, 449, 452

[56] References Cited
U.S. PATENT DOCUMENTS

| | | | |
|---|---|---|---|
| 3,707,640 | 12/1972 | Lerner | 313/349 |
| 3,794,873 | 2/1974 | Kaplan et al. | 313/349 |
| 4,242,613 | 12/1980 | Brambring et al. | 313/448 |
| 4,318,027 | 3/1982 | Hughes et al. | 313/449 |
| 4,368,405 | 1/1983 | Takenaka et al. | 313/449 |

FOREIGN PATENT DOCUMENTS 724781 12/1965 Canada ................. 313/447

Primary Examiner—Saxfield Chatmon, Jr.
Attorney, Agent, or Firm—Eugene M. Whitacre; Dennis H. Irlbeck; Vincent J. Coughlin, Jr.

[57] ABSTRACT

An electron gun comprises a cathode for generating at least one electron beam along a beam path and a plurality of electrodes spaced along the beam path from the cathode. The electrode adjacent to the cathode comprises an electrically conductive base member of a first material having an aperture extending therethrough. The base member has two opposing surfaces that have overlying layers of a second electrically conductive material disposed thereon. The overlying layers overhang the aperture in the base member. At least one of the overlying layers has a plurality of apertures therethrough.

5 Claims, 15 Drawing Figures

ELECTRODE FOR AN ELECTRON GUN

This is a continuation-in-part of application Ser. No. 145,237, filed Apr. 30, 1980, now U.S. Pat. No. 4,318,026 issued on Mar. 2, 1982.

The present invention relates to electron guns, and particularly to an improved electron gun electrode wherein the electrode includes two materials having a grid aperture etches in one of the materials and a plurality of apertures etched in the other material.

BACKGROUND OF THE INVENTION

Recent improvements in electron guns have been made wherein the shape of the electron gun grid electrode apertures are varied in a three-dimensional manner. Such grid aperture variations are made by appropriate punching and/or coining of a single material grid or by welding two pieces together that have different size and/or shaped apertures punched into them. These methods of achieving aperture change along the electron beam path have been found to be costly and are limited to those geometries which can be punched or coined. Therefore, there is a need for new, relatively inexpensive, electron gun grid electrodes that have apertures that vary in size and/or shape along the electron beam path. Such new grid electrodes should also have apertures of almost any geometry and spacing. A method of making such a grid is disclosed in my copending parent U.S. patent application, Ser. No. 145,237, now U.S. Pat. No. 4,318,026 issued on Mar. 2, 1982. Such a grid can be used to reduce the so-called "s" spacing between adjacent electron beams in multibeam devices such as cathode-ray tubes and projection kinescopes. A multibeam projection kinescope is disclosed in U.S. Pat. No. 4,259,692 issued to R. J. D'amato on Mar. 31, 1981 and incorporated herein for the purpose of disclosure.

SUMMARY OF THE INVENTION

An electron gun comprises means for generating at least one electron beam along a beam path and a plurality of electrodes spaced along the beam path from the beam generating means. The electrode adjacent to the beam generating means comprises an electrically conductive base member of a first material having an aperture extending therethrough. The base member has two opposing surfaces that have overlying layers of a second electrically conductive material disposed thereon. The overlying layers overhang the aperture in the base member. At least one of the overlying layers has a plurality of apertures therethrough.

DETAILED DESCRIPTION OF THE PREFERRED EMBODIMENT

Figure 1:
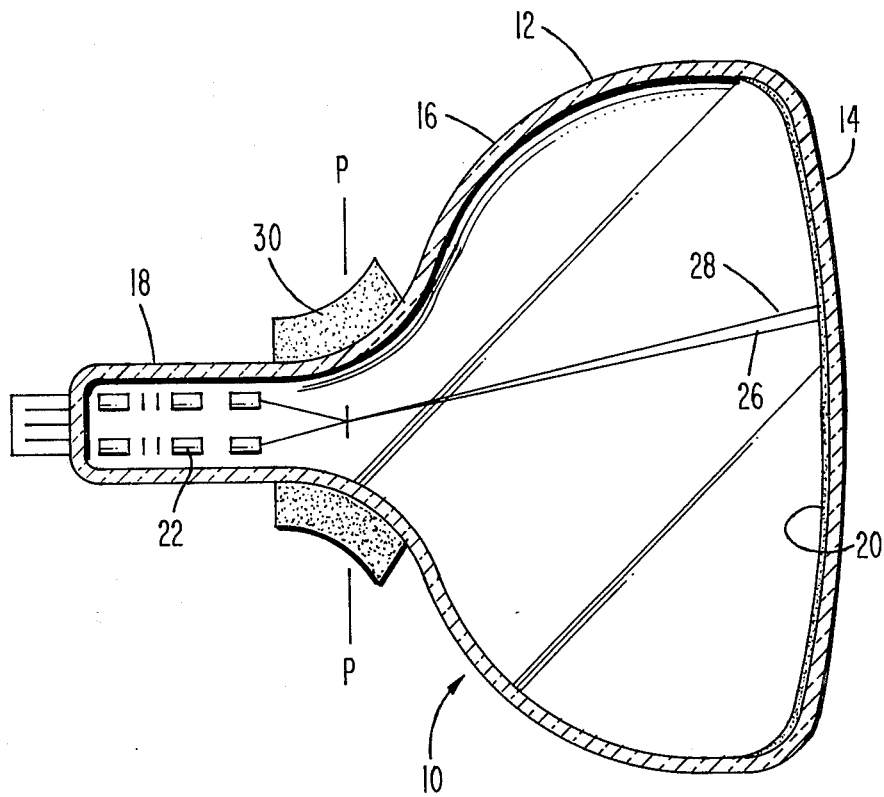
FIG. 1 is a cross-sectional side view of a projection kinescope in which one embodiment of the present invention is incorporated.

FIG. 1 is a side view of a projection kinescope 10 having an evacuated envelope 12 including a faceplate portion 14, a funnel portion 16 and a neck portion 18. The internal surface of the faceplate portion 14 is coated with a solid phosphor screen 20 cathodoluminescent in a single color. A multibeam inline electron gun 22 is positioned in the kinescope neck, with the plane of the beams 26 and 28 oriented vertically relative to the intended scan direction. A magnetic deflection yoke 30 is located on the outside of the envelope 12 surrounding the junction of the neck portion 18 with the funnel portion 16.

As disclosed in the above-mentioned D'Amato patent, the electron gun 22 may be modified to converge the beams to cross over near the deflection plane P—P of the yoke 30. When the beams 26 and 28 strike the screen 20, they are vertically displaced from each other. The beams 26 and 28 traverse the same scan lines but at different times. In order to accomplish this multiple excitation of each scan line, at least one delay line is added to the modulation control circuit for the upper beam 28 as described in the D'Amato patent.

Figure 2:
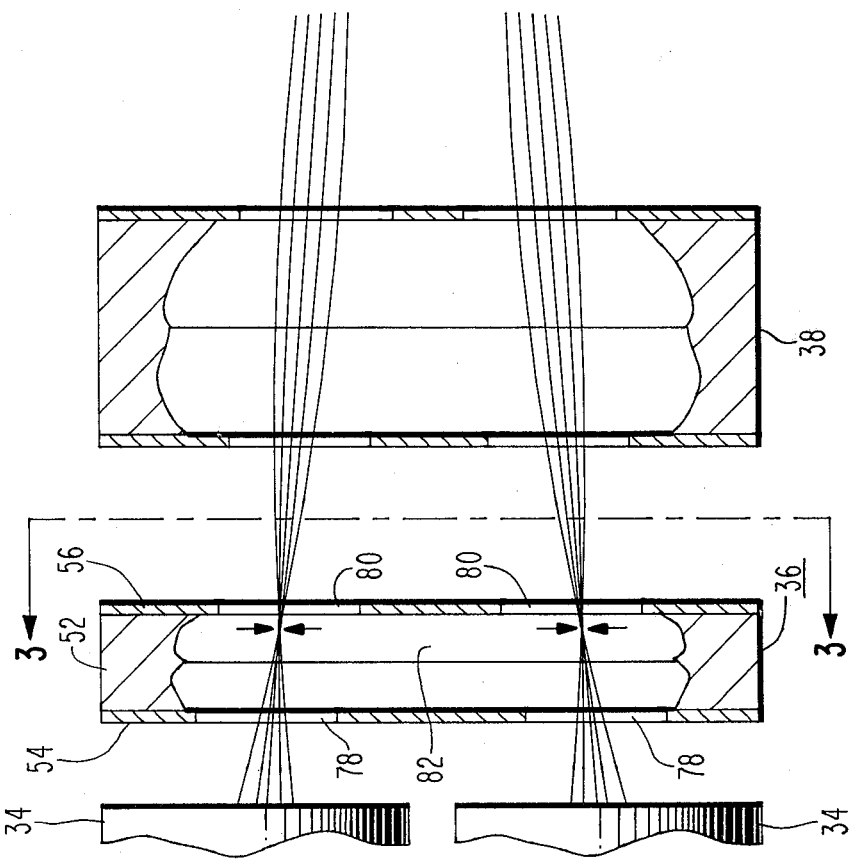
FIG. 2 is a sectional view of a portion of the electron gun shown schematically in FIG. 1.
Figure 4:
FIGS. 4–11 are sectional views through an electron gun grid illustrating the sequence of steps for forming a novel grid electrode.

The electron gun 22 shown in FIG. 2 comprises a plurality of glass support rods (not shown) on which the various electrodes are mounted. These electrodes includes two spaced coplanar cathodes 34 (one for each beam), a novel control grid electrode 36, a screen grid electrode 38, and not shown, first and second accelerating and focusing electrodes, and a nonmagnetically permeable electrical shield cup. The gun electrodes are spaced along the glass rods in the order named. Two magnetically permeable coma correction members, also not shown, may be located on the back wall of the shield cup.

Although the present invention is described herein as applied to a projection kinescope having a two beam inline electron gun, the novel grid electrode also may be used in constructing cathode-ray tubes having other types of electron guns such as single beam electron guns or three beam inline or delta electron guns. Furthermore, although the preferred embodiment applies to the novel control grid electrode, a similar novel structure also may be used for other electron gun electrodes, such as the screen grid electrode 38.

The gun 22 shown in FIG. 2 can be constructed utilizing conventional metal forming techniques with the exception of the fabrication of the control grid electrode 36. This electrode 36 includes two different electrically conductive materials. A base member 52 of a first material, such as steel, is the thickest portion of the electrode 36 and provides most of the rigidity for the electrode. The base member 52 has a thickness of about 0.127 mm (0.005 inch). Overlying layers 54 and 56 of a second material, such as nickel, cover the two opposing surfaces of the base member 52. The overlying layer 54 is disposed on the surface of the base member 52 proximate to the cathodes 34, while the overlying layer 56 is disposed on the surface of the base member 52 remote from the cathodes 34. Each of the overlying layers has a thickness of about 0.013 mm (0.0005 inch). Apertures may be formed in the electrode 36 by several variations in the novel method disclosed in my copending parent U.S. patent application, Ser. No. 145,237, now U.S. Pat. No. 4,318,026 issued on Mar. 2, 1982, which is incorporated herein for the purpose of disclosure. The preferred variation is described hereinafter. All of the variations include etching the base member 52 through openings in the overlying layers 54 and 56 until an aperture of sufficient size is formed so that the overlying layers 54 and 56 overhang the aperture in the base member 52. By using the foregoing procedure, it is possible to fabricate electrode apertures of many different three-dimensional configurations having reduced beam-to-beam spacing.

Figure 5:
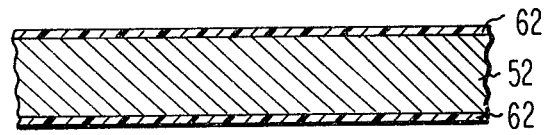
Figure 6:
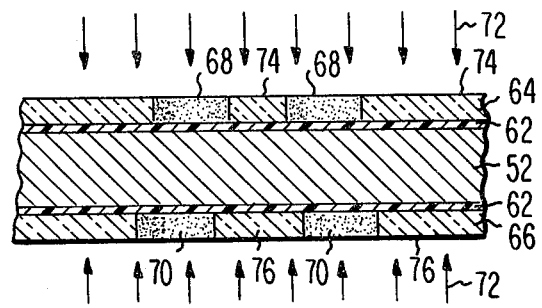
Figure 7:
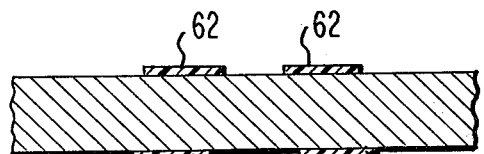
Figure 8:
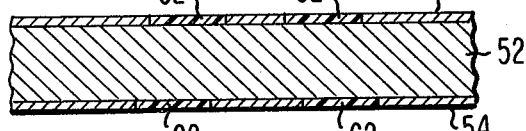
Figure 9:
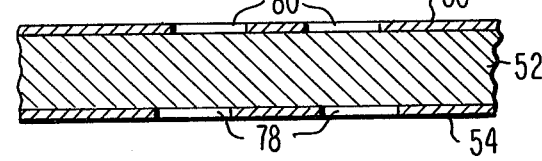
Figure 10:
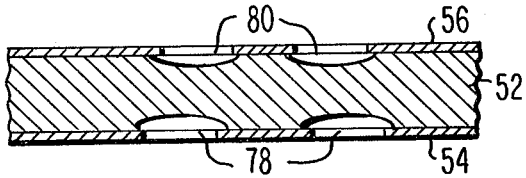

FIGS. 4 through 11 illustrate the sequential steps of one variation of the novel method of fabricating a three-dimensional grid aperture. The variation starts with an electrically conductive unapertured grid base member 52 shown in FIG. 4. The base member 52 is coated on both sides with a positive photoresist 62 as shown in FIG. 5. Next, a pair of photomaster plates 64 and 66 are placed against both sides of the photoresist coatings 62. The photomaster plates 64 and 66 have opaque elements 68 and 70, respectively, at the location of an intended aperture. The photoresist coatings 62 then are exposed through the photomaster plates 64 and 66 by light 72 projected through clear openings 74 and 76, respectively, in the photomaster plates, as shown in FIG. 6. Now the photoresist coatings 62 are developed and all portions of them except at the intended aperture locations are removed, as shown in FIG. 7. Thereafter, the parts of the base member 52 which are not covered by the remaining photoresist coatings 62 are plated with an electrically conductive second material to provide overlying layers 54 and 56 of different composition than that of the base member 52, as shown in FIG. 8. Next, the remaining photoresist coating 62 is removed, as shown in FIG. 9. Now the base member 52 is etched from both sides through the openings 78 and 80, respectively, in the overlying layers 54 and 56 where the remaining photoresist coating 62 was removed, as shown in FIG. 10, with an etchant that only etches the base member 52 but not the overlying layers 54 and 56. Etching is continued until the overlying layers 54 and 56 are sufficiently undercut so that they overhang the aperture 82 in the base member 52.

Figure 3:
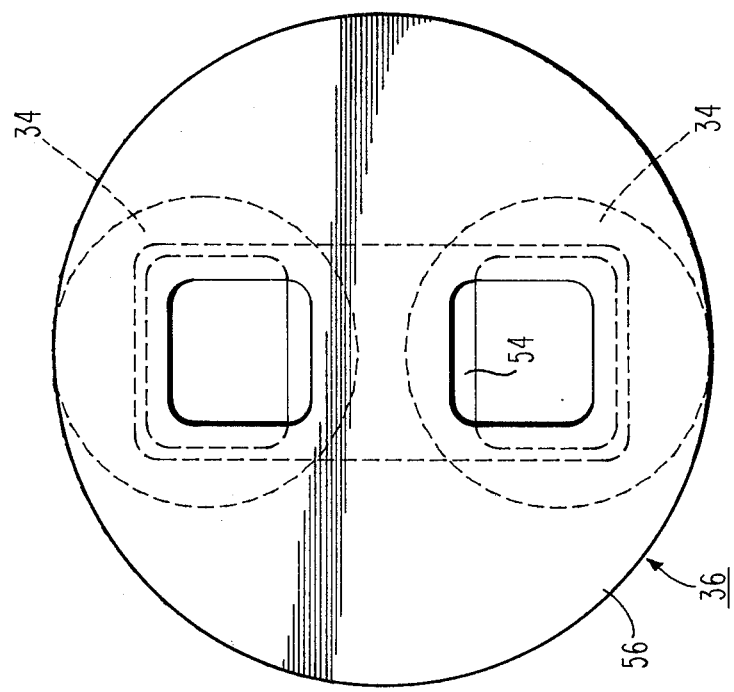
FIG. 3 is a section view taken along line 3—3 of FIG. 2.
Figure 11:
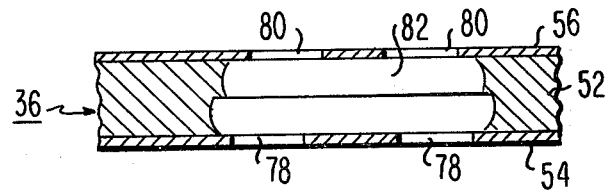

As shown in FIG. 11, the control grid electrode 36 may be formed by the above-described precision etching method to provide a plurality of coplanar apertures in each of the overlying layers 54 and 56. The apertures 78 in the overlying layer 54 are shown being offset with respect to the apertures 80 in the overlying layer 56; however, the aperture size, shape, alignment and spacing may be varied to alter the lens effect of the electrode. Furthermore, by varying the etching parameters by methods known in the art, the profile of the aperture 82 in the base member 52 may be tailored to meet a variety of lens applications. While the control electrode 36 is a unipotential single mechanical element, the geometrical shape of the overlying apertures 78 and 80 and the profile of the aperture 82 determines the nature of the electrostatic lens field of the electrode 36. As shown in FIG. 3, the overlying apertures are substantially rectangular.

The control grid electrode 36 shown in FIGS. 2, 3 and 11 comprises one of the electrodes which converge the electron beams from the cathodes 34 at the deflection center P—P of FIG. 1. The beams 26 and 28 then diverge to strike the screen 20 with a vertical displacement of one or more scan lines. The cathodes 34 are separate to permit the modulation of each beam. To keep the displacement between the beams 26 and 28 to a minimum at the screen, the beam-to-beam spacing of the gun should be about 1.5 mm (0.060 inch). This is considerably less than the beam-to-beam spacing of about 4 mm (0.157 inch) for the inline cathode-ray gun disclosed in U.S. Pat. No. 3,772,554 issued to R. H. Hughes on Nov. 13, 1973 which is formed by conventional parts forming techniques.

Figure 13:
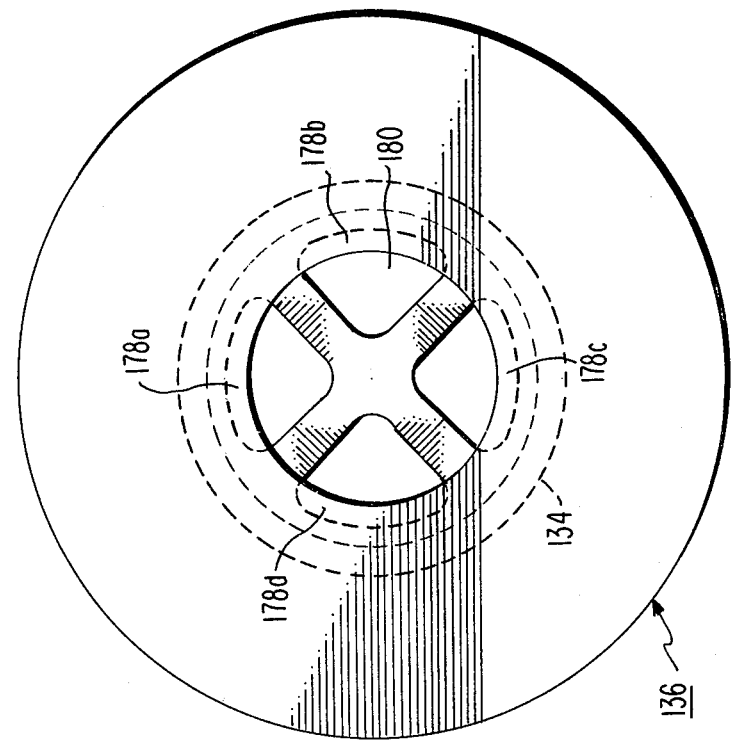
FIG. 13 is a section view taken along line 13—13 of FIG. 12.
Figure 12:
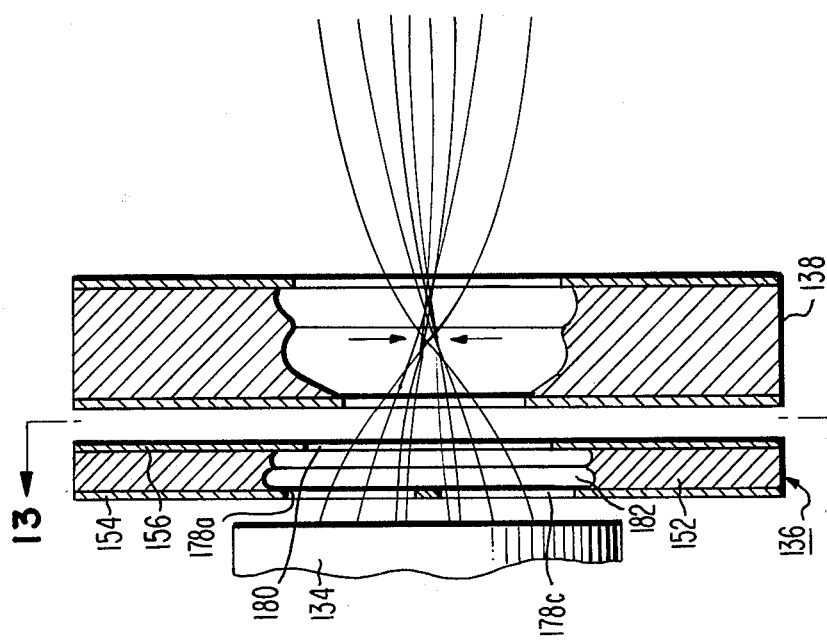
FIG. 12 is a cross-sectional view of an alternative embodiment of a portion of an electron gun.

An alternative embodiment of the present novel structure is shown in FIGS. 12 and 13. In this embodiment, a single electron beam comprises discrete beam bundles originating from isolated small areas on the cathode 134. The control grid electrode 136 converges the discrete beam bundles at a common crossover region within the screen grid electrode 138. When the beam bundles are converged so as to share a common crossover, the diameter of the resulting crossover is smaller than that which would result from a single cathode area equal to the sum of the isolated areas. The reduced crossover diameter provided by electrode 136 will permit the main lens, not shown, to focus a smaller spot at the center of the phosphor screen. It is recognized, however, that the small common crossover provided by the structure shown in FIG. 12 is not always advantageous. The discrete beam bundles are strongly converged by electrode 136 into a single electron beam at the crossover. The resultant single beam produced by electrode 136 diverges more after crossover than a resultant beam provided by a convention control grid from a single cathode area. Therefore, when the single beam exits from the main lens, the beam diameter occupies a larger region within the deflection center P—P and the beam is defocused when it is deflected. As shown in FIGS. 12 and 13, the control electrode 136 comprises a base member 152 of a first material such as 0.127 mm thick steel. Overlying layers 154 and 156 of a second material such as 0.013 mm thick nickel cover the two opposing surfaces of the base member 152. The pattern shown in FIG. 13 provides a plurality of substantially pie-shaped apertures 178a, 178b, 178c and 178d in the overlying layer 154, while a single aperture 180 is formed in the overlying layer 156. The overlying layers 154 and 156 overhang the single aperture 182 formed in the base member 152.

Figure 15:
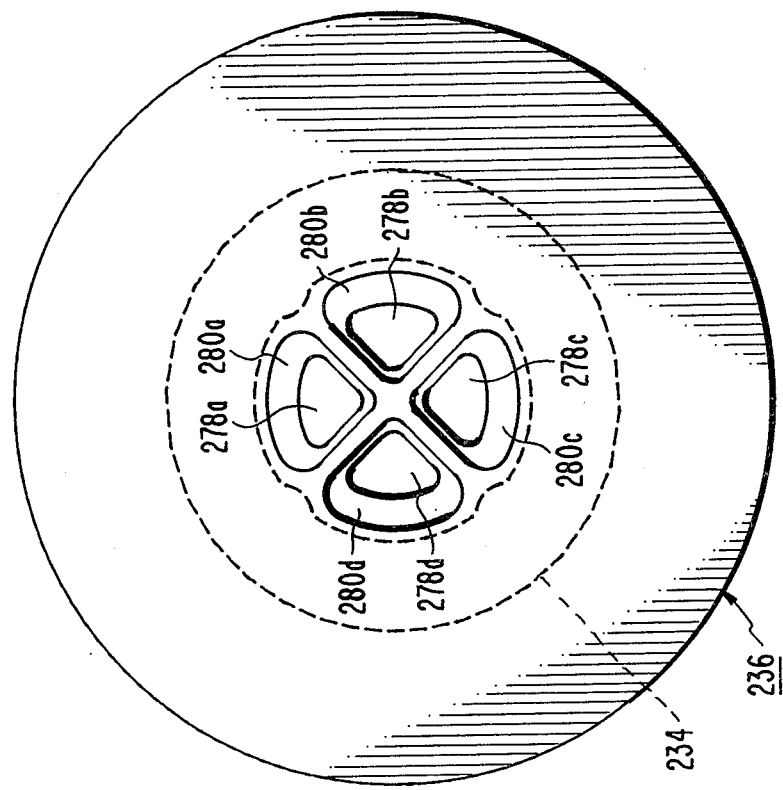
FIG. 15 is a section view taken along line 15—15 of FIG. 14.
Figure 14:
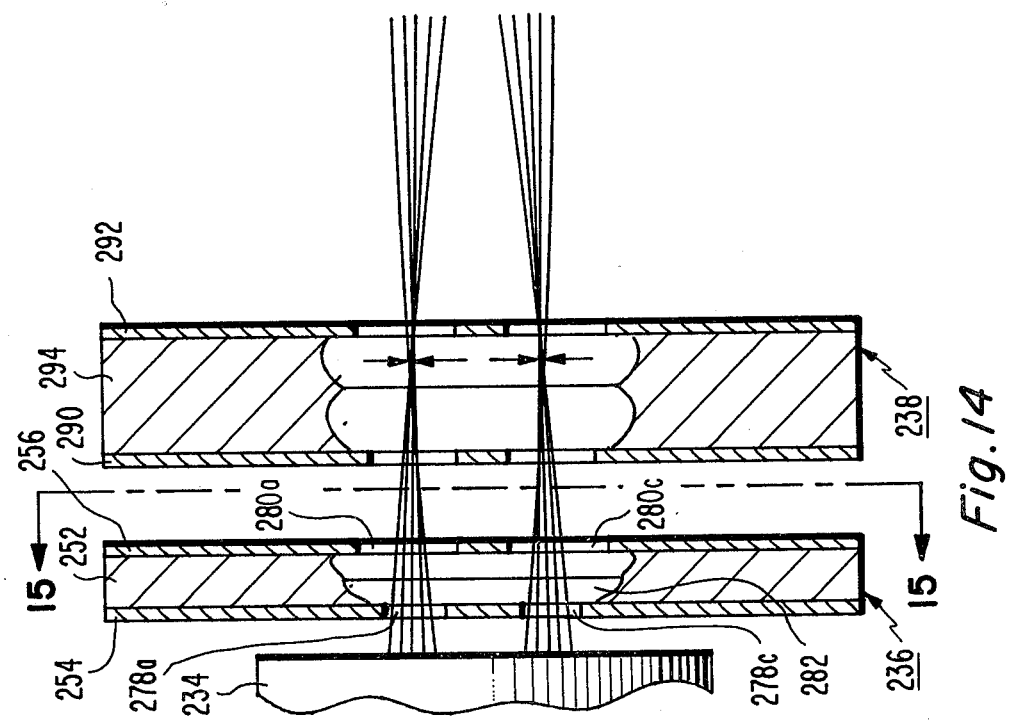
FIG. 14 is a cross-sectional view of a second alternative embodiment of a portion of an electron gun.

The disadvantage recited above for the lens structure of control grid electrode 136 can be overcome by a second alternative control grid electrode 236 shown in FIGS. 14 and 15. In this embodiment, isolated areas of cathode 234 are formed into a plurality of beams with separate crossovers which are aligned to pass through a minimum aperture of the main lens (not shown) and emerge from the deflection center P—P with less defocusing than that provided by electrode 136. Thus electrode 236 provides better deflected resolution with some increase in center spot size.

As shown in FIGS. 14 and 15, the electrode 236 comprises a base member 252 having a composition and thickness identical to that of base member 152. Overlying layers 254 and 256 are also identical in composition and thickness to overlying layers 154 and 156. The pattern shown in FIG. 15 provides a plurality of pie-shaped apertures 278a–278d in the overlying layer 254 and a like plurality of pie-shaped apertures 280a–280d in the overlying layer 256. The apertures bearing the same alphabetical designation, for example, 278a and 280a, are substantially aligned along one of the beam paths.

Each of the beam paths has a separate crossover so that for the electrode configuration shown in FIGS. 14 and 15, four separate crossovers occur within the screen electrode 238. In the structure of FIG. 14, the screen electrode 238 also has four pie-shaped apertures formed in each of the overlying layers 290 and 292 of nickel disposed on a base member 294. The etching process disclosed herein for forming the apertures in the control grid electrode 36, 136 and 236 is also used to form the screen grid electrodes. The electrode beam pattern produced by the electrode structure shown in FIGS. 14 and 15 can be described as a laminar flow beam.

The electrode structures described herein are merely descriptive of the large number of possible electrode configurations that can be obtained using precision etching techniques and are not limiting.

What is claimed is:

1. In an electron gun comprising a cathode and a plurality of electrodes spaced therefrom, the improvement wherein said electrode adjacent to said cathode comprises
    an electrically conductive base member of a first material having an aperture extending therethrough, said base member having two opposing surfaces, and
    overlying layers of a second electrically conductive material disposed on said opposing surfaces of said base member, said overlying layers overhanging said aperture in said base member, said overlying layer proximate to said cathode having a plurality of beam forming apertures therethrough which communicate with said aperture in said base member for forming a plurality of beam bundles which originate from isolated areas on said cathode.

2. The electron gun as described in claim 1 wherein said beam bundles are strongly converged into a single electron beam.

3. The electron gun described in claim 2 wherein said overlying layer remote from said cathode has a single aperture therethrough which communicates with said aperture in said base member.

4. The electron gun described in claim 1 wherein said overlying layer remote from said cathode has a plurality of apertures therethrough which communicate with said aperture in said base member.

5. In an electron gun comprising a cathode and a plurality of electrodes spaced therefrom, the improvement wherein the electrode adjacent to said cathode comprises
    an electrically conductive base member of a first material having an aperture extending therethrough, said base member having two opposing surfaces, and
    overlying layers of a second electrically conductive material disposed on said opposing surfaces of said base member overhanging said aperture therein, said overlying layer proximate to said cathode having a plurality of beam forming apertures therethrough and said overlying layer remote from said cathode having a like plurality of beam forming apertures therethrough, said apertures in said remote layer being aligned with said apertures in said proximate layer, said apertures in said proximate layer and in said remote layer communicating with said aperture in said base member for forming a plurality of electron beams which originate from isolated areas of said cathode.

* * * * *